United States Patent [19]

Browne

[11] Patent Number: 4,889,626
[45] Date of Patent: Dec. 26, 1989

[54] FILTER CARTRIDGE HAVING A TUNABLE ASYMMETRIC FLUOROPOLYMER ALLOY FILTER MEMBRANE

[75] Inventor: Ronnie Browne, Derry, N.H.

[73] Assignee: Memron, Inc., Amherst, N.H.

[21] Appl. No.: 272,738

[22] Filed: Nov. 17, 1988

[51] Int. Cl.⁴ .............................................. B01D 29/14
[52] U.S. Cl. ....................................... 210/359; 55/377
[58] Field of Search ............... 210/350, 356, 407, 297, 210/232, 359, 435, 446, 450, 451, 452, 455, 500.1, 321.6; 55/361, 373–377

[56] References Cited

U.S. PATENT DOCUMENTS 4,664,814  5/1987  Backman et al. ..................... 210/780

Primary Examiner—Frank Sever
Attorney, Agent, or Firm—Weingarten, Schurgin, Gagnebin & Hayes

[57] ABSTRACT

A filter cartridge having a tubular, self-supporting, tunable, asymmetric, fluoropolymer alloy filter membrane is provided. Within a sealed cartridge assembly, the tubular filter membrane is connected at opposite ends to inlet and outlet tubes which pass through opposite ends of the cartridge assembly. A guide attached to the end of the inlet tube within the sealed cartridge assembly plugs the end of the inlet tube within the sealed cartridge assembly and provides a filter medium passage from the inside of the inlet tube to the outside of the tubular filter membrane. The outlet tube provides a filter medium passage from the inside of the tubular filter membrane. The input and output tubes are slideably disposed in the ends of the cartridge assembly such that the axial length and therefore the porosity of tubular filter membrane can be adjusted over a range.

24 Claims, 2 Drawing Sheets

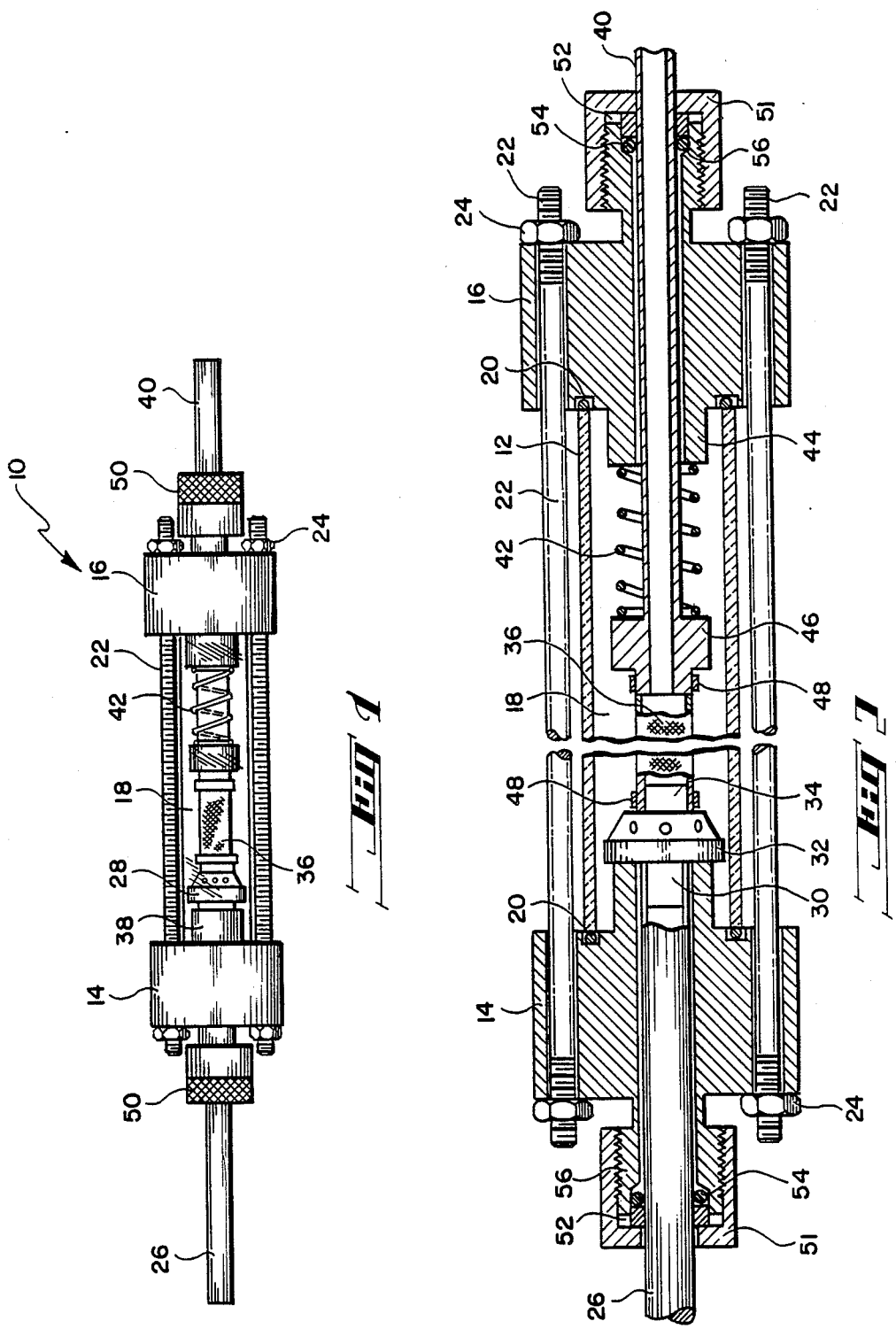

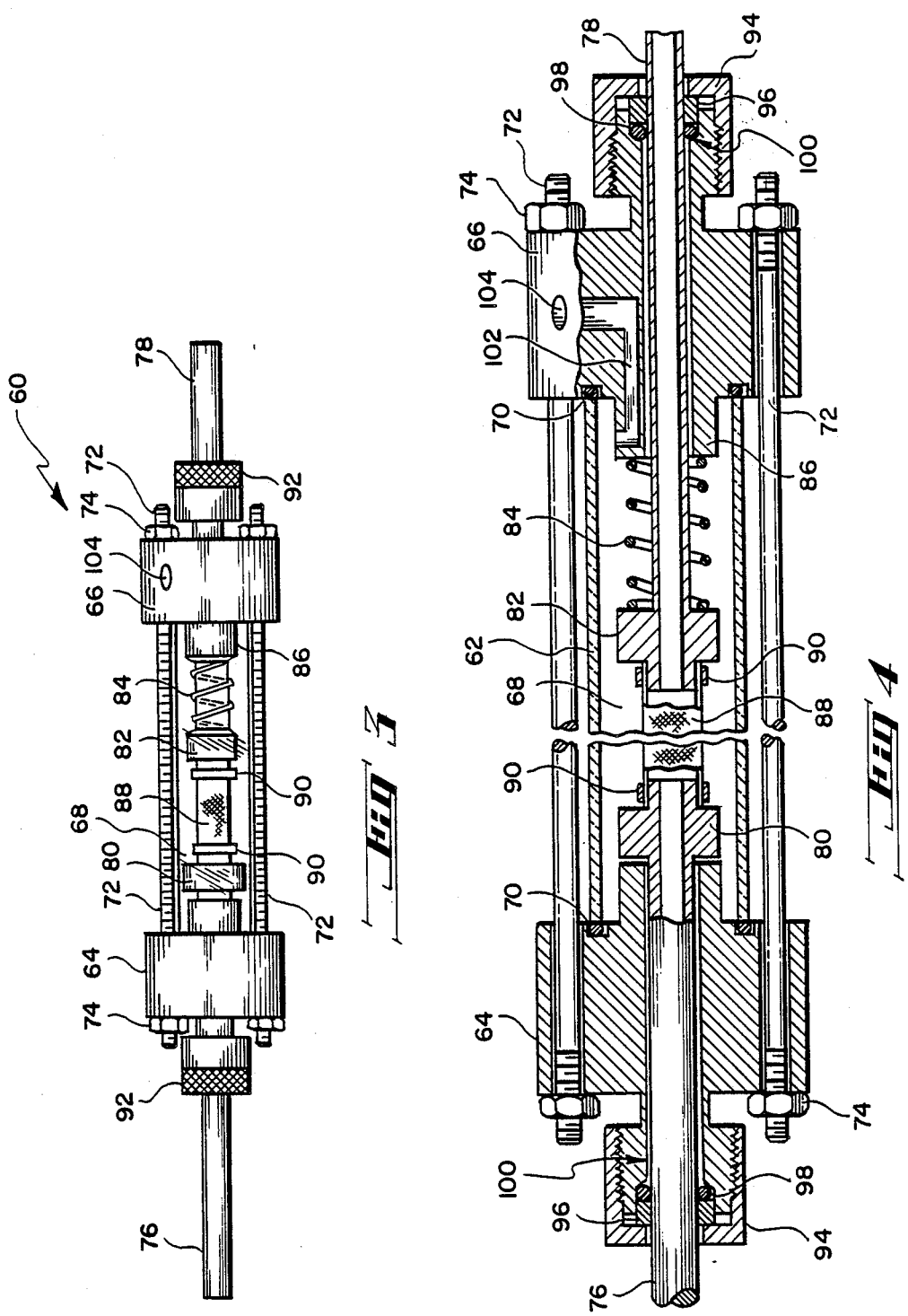

FILTER CARTRIDGE HAVING A TUNABLE ASYMMETRIC FLUOROPOLYMER ALLOY FILTER MEMBRANE

FIELD OF THE INVENTION

This invention relates to filter cartridges and in particular to a filter cartridge employing a self-supporting, tunable, asymmetric fluoropolymer alloy membrane.

BACKGROUND OF THE INVENTION

Filtration occurs by passing a contaminated medium, such as a fluid or gas, through a barrier material, called a filter membrane, that removes most, but not necessarily all contaminates in the medium. Typically, the contaminates are particles in a concentration that can vary from a few parts per million to such a high concentration that the medium will not easily flow through the filter membrane. The contaminates, however, need not always be particles but may also be fluid or gases of a specific gravity different from the medium being filtered.

Sparging, a type of filtration, occurs when the filter membrane is used to separate a gas from a fluid stream in such a way that the separated gas is allowed to dissipate into the atmosphere or is carried away from the membrane for use or disposal. Sparging also occurs when the filter membrane is used to introduce a gas into a fluid stream at a desired rate.

For any given filter membrane, the exact percentage of particulate contamination the filter membrane will retain during filtration will vary with the particle size of the particulate contamination in the medium being filtered and the micron rating of a filter membrane. Furthermore, as contaminates are trapped on the inlet surface of the filter membrane or within the depth of the filter membrane, the filtration characteristics of the filter membrane will change. As filtration proceeds, resistance to flow of the medium being filtered increases because of the ever increasing presence of contaminates trapped by the filter membrane. As the resistance to flow increases, however, the efficiency of the filter membrane improves because trapped particulate contaminants trap other contaminants which might not have otherwise been trapped by the filter membrane. At some point in the life of the filter membrane, however, resistance to flow through the filter membrane becomes so high that the filter membrane must be replaced or, if possible, backflushed to remove all contamination.

Other characteristics of a filter membrane are permeability, retention rate and capacity, and each have a profound effect upon the performance and cost of the filter membrane. Permeability, which should not be confused with porosity, is the rate at which a given medium will flow through a filter membrane under given conditions. It is the inverse of resistance to flow. Porosity, however, is the fraction of air void within the filter membrane.

Retention rate, also referred as efficiency, is the ability of a given filter membrane to remove particulate contamination of a given size. The retention rate of a filter membrane is indicated by its micron rating, which is determined by a non-destructive "ethynol bubble point" test.

The capacity of a filter membrane is its ability to filter over time before its permeability drops below a given level. For example, many filter membranes are evaluated by passing a fluid through the membrane at a constant rate of flow while gradually introducing particulate contamination and measuring the increase in pressure drop across the membrane over time. The capacity of the filter membrane, and therefore its useful life, is indicated when the pressure drop, and therefore the permeability of the filter membrane, reaches a predetermined level.

As can be surmised, a correlation between permeability and retention rate exists. The higher the retention rate of a given filter medium, the lower the permeability of the filter medium. Thus, if one were able to adjust the porosity, and therefore adjust the retention rate, of a filter membrane during conventional filtration, one could vary the permeability of the filter membrane during filtration or one could maintain a constant permeability for the filter membrane as ever increasing amounts of particulate contamination are trapped by the membrane.

SUMMARY OF THE INVENTION

In brief, a filter cartridge having a tunable, self-supporting, asymmetric fluoropolymer alloy filter membrane is provided. In one embodiment a tunable, self-supporting, asymmetric, porous fluoropolymer alloy tube is disposed within a filter medium compartment in a filter cartridge assembly having two ends. An inlet tube passes through one end of the cartridge assembly and connects with one end of the asymmetric, porous fluoropolymer alloy tube by means of a filter medium guide attached to the end of the inlet tube. The filter medium guide has a cylindrical portion to which the end of the fluoropolymer alloy tube attaches. The purpose of the filter medium guide is to direct a medium to be filtered, such as a fluid or gas, from the inside of the inlet tube to the area of the filter medium compartment around the outside of the fluoropolymer alloy tube. The filter medium guide also occludes the end of the fluoropolymer alloy tube and provides a solid structure to which the end of the fluoropolymer alloy tube attaches. Thus, the input tube and its filter medium guide provide a filter medium passage to the outside surface of the fluoropolymer alloy tube.

A spring-based outlet tube passes through the opposite end of the cartridge assembly and connects to the opposite end of the asymmetric porous fluoropolymer alloy tube. The output tube thus provides a filter medium passage from the inside surface of the asymmetric porous fluoropolymer alloy tube. Therefore, the fluoropolymer alloy tube acts as a barrier between the input and output tubes and forms a filter membrane for conventional filtration.

The inlet and outlet tubes are slideably disposed within the cartridge assembly ends and can be locked in a desired position by locknuts attached to the cartridge assembly ends. Thus, the space between the filter medium guide of the inlet tube and the end of the outlet tube within the filter medium compartment can be adjusted to any desired size within a range to correspondingly adjust the length of the fluoropolymer alloy tube.

In an alternative embodiment, the self-supporting, tunable, asymmetric porous fluoropolymer alloy tube is disposed within a gas compartment in a filter cartridge assembly similar to the assembly of the embodiment discussed above. Inlet/outlet tubes pass through opposite ends of the cartridge assembly and connect to opposite ends of the asymmetric porous fluoropolymer alloy tube. One of the inlet/outlet tubes is spring-based and both of the inlet/outlet tubes are slideably disposed within the cartridge assembly ends and can be locked in desired positions by locknuts attached to the cartridge assembly ends. The inlet and outlet tubes therefore provide a fluid passage through the inside of the asymmetric porous fluoropolymer alloy tube and are adjustable to correspondingly adjust the length of the fluoropolymer alloy tube to any desired length with a range.

A passageway is formed in one of the ends of the cartridge assembly and connects the gas compartment of the assembly to a port disposed on the side of the cartridge assembly end. The port and the passageway formed in the cartridge assembly end provide a gas passage into and out of the gas chamber surrounding the outside of the asymmetric porous fluoropolymer alloy tube. Therefore, the fluoropolymer alloy tube acts as a barrier between the fluid passage through the inside of the fluoropolymer alloy tube and the gas compartment in the cartridge assembly and forms a filter membrane for sparging.

The present invention is only now possible because the filter membrane is made of a tunable, self-supporting, asymmetric, porous fluoropolymer alloy material which has only recently been developed. The material is a unique alloy of two or more polytetrafluoroethylene or other fluoropolymer resins having different stretch characteristics and is thoroughly described in co-pending application entitled "Porous Fluoropolymer Alloy and Process of Manufacture", filed on Nov. 17, 1988, which is incorporated herein by reference.

The tunable, self-supporting, asymmetric porous fluoropolymer alloy of which the filter membrane is fabricated has a microstructure of nodes interconnected by fibrils oriented in a single direction, which nodes and fibrils define the pore sizes throughout the material. The material is self-supporting because it is not bonded or otherwise attached to a supporting fabric or structure. The material has a unique asymmetric structure because the pore size of one surface of the material is larger than the pore size of the opposite surface of the material, the pore sizes of the material gradually change throughout the material from the size of the one surface to the size of the opposite surface, and the fibrils of the material are oriented in the same direction throughout the material. The material is tunable because by compressing the material from its relaxed state along its direction of fibril orientation, the fibrils of the microstructure can be contracted to concurrently change the pore sizes throughout the material.

The present invention, which employs a filter membrane made of the tunable, asymmetric, porous fluoropolymer alloy material, has the advantage over prior art filters of eliminating the need for trial and error methods to find an exact micron-rated material for a specific filtration or sparging requirement. The filter membrane of the present invention easily adjusts at any time to any desired micron rating within a range.

Because the present invention is tunable it also has the advantage that the pores of the filter membrane of the present invention can be opened wide to their relaxed-state size to easily pre-wet the filter membrane and then closed to an optimal desired filtration pore size.

The tunable feature of the present invention also facilitates backflushing of the filter membrane. Because the pore sizes of the filter membrane can be adjusted, the pores of the filter membrane can be opened to their relaxed-state size after filtration and backflow applied through the filter membrane to flush away more trapped particulate contamination than possible from prior art filters.

Furthermore, the asymmetric pore structure of the filter membrane material of the present invention allows the present invention to act as a depth as well as an absolute filter. During filtration the structure of the filter membrane material allows the filter membrane to progressively remove contaminates of decreasing size as the medium being filtered flows through the filter membrane. The filter membrane of the present invention thus takes longer to plug than conventional symmetric filter membranes.

BRIEF DESCRIPTION OF THE DRAWINGS

The invention will be more fully understood from the following detailed description provided in conjunction with the accompanying drawings, in which:

FIG. 1 is a plan view of an embodiment of the present invention suitable for conventional filtration.

FIG. 2 is a cross-section plan view of the embodiment of the present invention shown in FIG. 1.

FIG. 3 is a plan view of an embodiment of the present invention suitable for sparging.

FIG. 4 is a cross-section plan view of the embodiment of the present invention shown in FIG. 3.

DETAILED DESCRIPTION OF THE INVENTION

Referring to FIGS. 1 and 2, there is shown an embodiment of the present invention suitable for conventional filtration. Tunable filter cartridge assembly 10 is comprised of filter medium compartment cylinder 12 sealed at its ends by first and second cartridge assembly ends 14 and 16. Filter medium compartment cylinder 12, and first and second cartridge assembly ends 14 and 16 define a filter medium compartment 18 within the space of tunable filter cartridge assembly 10. First and second cartridge assembly ends 14 and 16 are held in sealed engagement with filter medium compartment cylinder 12 to form filter medium compartment 18 by means of O rings 20 and threaded rods 22 secured by nuts 24.

Within an axial hole in first cartridge assembly end 14 input tube 26 is slideably disposed. Filter medium guide 28 attaches to the end of input tube 26 within filter medium compartment 18 by means of cylindrical portion 30 which presses into the end of input tube 26. On the end of body 32 of filter medium guide 28 opposite to the end on which cylindrical portion 30 is formed, a second cylindrical portion 34, which acts as a plug, is formed and engages the inside of one end of tubular filter membrane 36. The purpose of filter medium guide 28 is to guide a medium to be filtered, such as a fluid or gas, from the inside of input tube 26 to the area within filter medium compartment 18 around the outside of tubular filter membrane 36. Filter medium guide 28 contains a passageway from the inside of input tube 26 through cylindrical portion 30 to holes radially disposed around body 32 of the filter medium guide. Filter medium guide 28 also acts as a stop to limit the travel of input tube 26 within first cartridge assembly end 14.

The body 32 of filter medium guide 28 is wider then the inside diameter of the axial hole through first cartridge assembly end 14. A left stop 38 is provided in filter medium compartment 18 on first cartridge assembly end 14 around the axial hole in first cartridge assembly end 14.

Within an axial hole in second cartridge assembly end 16, output tube 40 is slideably disposed and is biased by spring 42 to an inward extended position within filter medium compartment 18, as shown in FIGS. 1 and 2. Spring 42 wraps around output tube 40 and seats against right stop 44 formed on second cartridge assembly end 16 and spring seat 46 formed on output tube 40 near the end of the tube within filter medium compartment 18. The end of output tube 40 within filter medium compartment 18 engages the inside of the opposite end of tubular filter membrane 36.

Tubular filter membrane 36 is made of the tunable, self-supporting, asymmetric, porous fluoropolymer alloy material described in co-pending application entitled "Porous Fluoropolymer Alloy Material and Process of Manufacture", filed on Nov. 17, 1988. The material has a microstructure of nodes interconnected by fibrils oriented in a single direction, which nodes and fibrils define the pore sizes throughout the material. The material is self supporting because it is not bonded or otherwise attached to a supporting fabric or structure. The material has a unique asymmetric structure because the pore size of one surface of the material is larger than the pore size of the opposite surface of the material, the pore sizes of the material gradually change throughout the material from the size of the one surface to the size of the opposite surface, and the fibrils of the material are oriented in the same direction throughout the material. The material is tunable because by compressing the material from its relaxed state along its direction of fibril orientation, the fibrils of the microstructure can be contracted to concurrently change the pore sizes throughout the material. Tubular filter membrane 36 is fabricated from the material into a tubular shape such that the fibrils of the material of the membrane are oriented in the direction of the longitudinal axis of the tubular membrane.

Tubular filter membrane 36 is disposed within filter medium compartment 18 between input and output tubes 26 and 40 such that one end of tubular filter membrane 36 is attached over second cylindrical portion 34 of filter medium guide 28 and the opposite end of tubular filter membrane 36 is attached over the end of output tube 40 within filter medium compartment 18. Retaining rings 48 clamp the ends tubular filter membrane 36 around second cylindrical portion 34 and the end of output tube 40 within filter medium compartment 18. Therefore, as can be seen in FIGS. 1 and 2, input tube 26 and filter medium guide 28 direct the medium to be filtered to the outside area of tubular filter membrane 36, and output tube 40 directs the medium from the inside area of the tubular filter membrane after filtration.

To lock input and output tubes 26 and 40 at desired positions within first and second cartridge assembly ends 14 and 16, locknuts 50 are provided on first and second cartridge assembly ends 14 and 16. As thumb screws 51 are tightened, locknut collars 52 are forced against locknut O rings 54. Because of angular lands 56, such action forces locknut O rings 54 tightly against input and output tubes 26 and 40 to lock the tubes in place.

As is apparent from the above description and FIGS. 1 and 2, the relative positions of input and output tubes 14 and 16 can be adjusted over a range to vary the distance between filter medium guide 28 and the end of output tube 40 within filter medium compartment 18. Therefore, the length of tubular filter membrane 36 can correspondingly be adjusted over a range. Because tubular filter membrane 36 is made of the tunable, self-supporting, asymmetric, porous fluoropolymer alloy material as described above, as the axial length of tubular filter membrane 36 is decreased from its relaxed-state length, the fibrils of the microstructure of the filter membrane are contracted and the pore sizes throughout the filter membrane are concurrently decreased. Therefore, the present invention is tunable and the filter membrane can be infinitely adjusted to any desired porosity.

If the axial length of tubular filter membrane 36 is increased from its relaxed-state length, the microstructure of the filter membrane would expand and the pore sizes throughout the filter membrane would concurrently increase until fracture of the filter membrane. Although the length of the tubular filter membrane of the present invention can be increased beyond the relaxed-state length of the membrane, repeated expansion of the filter membrane beyond its relaxed-state length is not desirable because each expansion would break fibrils throughout the filter membrane, which would incrementally reduce the useful life of the membrane. Therefore, repeated expansion of the tubular filter membrane would substantially reduce the useful life of the membrane.

Referring to FIGS. 3 and 4, there is shown an embodiment of the present invention suitable for sparging. Tunable filter cartridge assembly 60 is comprised of gas compartment cylinder 62 sealed at its ends by first and second cartridge assembly ends 64 and 66. Gas compartment cylinder 62, and first and second cartridge assembly ends 64 and 66 define a gas compartment 68 within the space of tunable filter cartridge assembly 60. First and second cartridge assembly ends 64 and 66 are held in sealed engagement with gas compartment cylinder 62 to form gas compartment 68 by means of O rings 70 and threaded rods 72 secured by nuts 74.

Within axial holes in first and second cartridge assembly ends 64 and 66, first and second input/output tubes 76 and 78 are slideably disposed. First and second tube end stops 80 and 82 are formed on the ends of first and second input/output tubes 76 and 78 within gas compartment 68 to prevent the ends of the tubes within the gas compartment from being pulled through the axial holes of the first and second cartridge assembly ends 64 and 66 out of the gas compartment.

Second input/output tube 78 is biased by spring 84 to an inward extended position within gas compartment 68, as shown in FIGS. 3 and 4. Spring 84 wraps around second input/output tube 78 and seats against assembly end stop 86 formed on second cartridge assembly end 66 and second tube end stop 82 on second input/output tube 78. The ends of first and second input/output tubes 76 and 78 within gas compartment 68 engage the insides of the opposite ends of tubular filter membrane 88.

Tubular filter membrane 88 is made of the tunable, self-supporting, asymmetric, porous fluoropolymer alloy material as discussed above. Retaining rings 90 clamp the ends of tubular filter membrane 88 around the ends of first and second input/output tubes 76 and 78 within gas compartment 68. Therefore, as can be seen in FIGS. 3 and 4, first and second input/output tubes 76 and 78 provide a fluid passage through the inside of tubular filter membrane 88.

First and second input/output tubes 76 and 78 can be locked at desired positions in first and second cartridge assembly ends 64 and 66 by locknuts 92 provided on first and second cartridge assembly ends 64 and 66. As thumbscrews 94 are tightened, locknut collars 96 are forced against locknut O rings 98. Because of angular lands 100, such action forces locknut O rings 98 tightly against first and second input/output tubes 76 and 78 to lock the tubes in place.

A gas passageway 102 is formed in second cartridge assembly end 66 to a gas port 104 disposed on the side of second cartridge assembly end 66. Gas passageway 102 and gas port 104 formed in second cartridge assembly end 66 provide a gas passage into and out of the area around the outside of tubular filter membrane 88.

As is apparent from the above description and FIGS. 3 and 4, the relative positions of first and second input/output tubes 76 and 78 can be adjusted over a range to vary the distance between the ends of the input/output tubes within gas compartment 68. Therefore, the length of tubular filter membrane 88 can be correspondingly adjusted over a range. Because tubular filter membrane 88 is made of the same tunable, self-supporting, asymmetric, porous fluoropolymer alloy material in the same way as tubular filter membrane 36 of the FIGS. 1 and 2 embodiment discussed above, tubular filter membrane 88 can be infinitely adjusted to any desired porosity over a range in the same manner as tubular filter membrane 36 of the FIGS. 1 and 2 embodiment.

It should be appreciated that this detailed description discloses presently preferred embodiments of the invention. Other embodiments within the scope of this invention can be devised. Therefore, the present invention should not be considered to be limited by what has been described above and is only limited by the following claims.

What is claimed is:

1. A tunable filter cartridge for removing contaminates from a medium, comprising:
    an inlet;
    an outlet;
    a fluoropolymer filter membrane separating the inlet from the outlet and having a first surface confronting the inlet and a second opposite surface confronting the outlet, wherein the filter membrane has a microstructure comprised of nodes joined by fibrils aligned in a direction of orientation sufficient to selectively adjust the size of the pore microstructure, which nodes and fibrils form pores through the filter membrane, wherein the microstructure changes from a relatively large pore microstructure on the first surface to a relatively small pore microstructure on the second surface:
    tuning means for physically adjusting the dimension of the filter membrane along the direction of orientation sufficient to selectively adjust the size of the pore microstructure.

2. The tunable filter cartridge of claim 1, wherein the fluoropolymer filter membrane is made of polytetrafluoroethylene.

3. The tunable filter cartridge of claim 1, wherein the fluoropolymer filter membrane is made of an alloy of two or more fluoropolymer resins.

4. The tunable filter cartridge of claim 3, wherein the fluoropolymer filter membrane is made of an alloy of two or more polytetrafluoroethylene resins.

5. The tunable filter cartridge of claim 4, wherein the fluoropolymer filter membrane is made of an alloy of a first layer of a first polytetrafluoroethylene resin, a second layer of a second polytetrafluoroethylene resin and an intermediate layer disposed between the first and second layers of a mixture of the first and second polytetrafluoroethylene resins.

6. The tunable filter cartridge of claim 1, wherein the fluoropolymer filter membrane is of tubular shape and wherein the tuning means is capable of decreasing the axial length of the filter membrane.

7. A tunable filter cartridge for sparging, comprising:
    a fluid passage;
    a gas passage;
    a fluoropolymer filter membrane separating the fluid passage from the gas passage and having a first surface confronting the gas passage and a second opposite surface confronting the fluid passage, wherein the filter membrane has a microstructure comprised of nodes joined by fibrils aligned in a direction of orientation sufficient to selectively adjust the size of the pore microstructure, which nodes and fibrils form pores through the filter membrane, wherein the microstructure changes from a relatively large pore microstructure on the first surface to a relatively small pore microstructure on the second surface
    tuning means for physically adjusting the dimension of the filter membrane along the direction of orientation sufficient to selectively adjust the size of the pore microstructure.

8. The tunable filter cartridge of claim 7, wherein the fluoropolymer filter membrane is made of polytetrafluoroethylene.

9. The tunable filter cartridge of claim 7, wherein the fluoropolymer filter membrane is made of an alloy of two or more fluoropolymer resins.

10. The tunable filter cartridge of claim 9, wherein the fluoropolymer filter membrane is made of an alloy two or more polytetrafluoroethylene resins.

11. The tunable filter cartridge of claim 10, wherein the fluoropolymer filter membrane is made of an alloy of a first layer of a first polytetrafluoroethylene resin, a second layer of a second polytetraflouroethylene resin and an intermediate layer disposed between the first and second layers of a mixture of the first and second polytetrafluoroethylene resins.

12. The tunable filter cartridge of claim 7, wherein the flouropolymer alloy filter membrane is of tubular shape and wherein the tuning means is capable of decreasing the axial length of the filter membrane.

13. A tunable filter cartridge for removing contaminates from a filter medium, comprising:
    a sealed filter medium compartment having first and second opposite ends, each end having an axial hole therethrough;
    an inlet tube slideably disposed in the axial hole of the first opposite end of the filter medium compartment, wherein one end of the inlet tube is within the filter medium compartment and a second opposite end of the inlet tube is out of the filter medium compartment and provides a connection to a filter medium source;
    an outlet tube slideably disposed in the axial hole of the second opposite end of the filter medium compartment, wherein one end of the outlet tube is within the filter medium compartment and a second opposite end of the outlet tube is out of the filter medium compartment and provides a connection to a filter medium destination;
    a filter medium guide disposed on the end of the inlet tube within the filter medium compartment, wherein the guide occludes the end of the inlet tube within the filter medium compartment and guides filter medium from the inside of the inlet tube into the filter medium compartment;

a tunable, asymmetric, tubular fluoropolymer filter membrane having a pore microstructure and first and second open opposite ends, wherein the first open opposite end axially connects in sealed engagement to the filter medium guide and the second open opposite end axially connects in sealed engagement to the end of the outlet tube within the filter medium compartment such that a fluid passage is provided from the inside of the filter membrane to the inside of the outlet tube; the inlet and outlet tubes being slidable to adjust the axial dimension of the filter membrane sufficient to adjust the size of the pore microstructure; and means for locking the inlet and outlet tubes at selected positions within the axial holes of the first and second opposite ends of the filter medium compartment.

14. The tunable filter cartridge of claim 13, wherein the tunable, asymmetric, tubular fluoropolymer filter membrane is made of polytetrafluoroethylene.

15. The tunable filter cartridge of claim 13, wherein the tunable, asymmetric, tubular fluoropolymer filter membrane is made of an alloy of two or more fluoropolymer resin.

16. The tunable filter cartridge of claim 15, wherein the tunable, asymmetric, tubular fluoropolymer filter membrane is made of an alloy of two or more polytetrafluoroethylene resins.

17. The tunable filter cartridge of claim 16, wherein the tunable, asymmetric, tubular fluoropolymer filter membrane is made of an alloy of a first layer of a first polytetrafluoroethylene resin, a second layer of a second polytetrafluoroethylene resin and an intermediate layer disposed between the first and second layers of a mixture of the first and second polytetrafluoroethylene resins.

18. The tunable filter cartridge of claim 13, wherein the means for locking the inlet and outlet tubes includes a plurality of locknuts each disposed on one of the opposite ends of the filter medium compartment.

19. A tunable filter cartridge for sparging, comprising:

a sealed gas compartment having first and second opposite ends, each end having an axial hole therethrough, and a gas port providing a gas passage into and out of the inside of the sealed gas compartment;

first and second tubes slideably disposed in the axial holes of the opposite ends of the gas compartment, wherein one end of each of the first and second tubes is within the gas compartment and a second end of each of the first and second tubes is out of the gas compartment and provides a connection to an external fluid line;

a tunable, asymmetric tubular fluoropolymer filter membrane having a pore microstructure and first and second open opposite ends, wherein the open opposite ends axially connects in sealed engagement to the ends of the first and second tubes within the gas compartment such that a fluid passage is provided from the first tube through the filter membrane to the second tube the first and second tubes being slidable to adjust the axial dimension of the filter membrane sufficient to adjust the size of the pore microstructure;

means for locking the first and second tubes at selected positions within the axial holes of the opposite ends of the gas compartment.

20. The tunable filter cartridge of claim 19, wherein the tunable, asymmetric, tubular fluoropolymer filter membrane is made of polytetrafluoroethylene.

21. The tunable filter cartridge of claim 19, wherein the tunable, asymmetric, tubular fluoropolymer filter membrane is made of an alloy of two or more fluoropolymer resins.

22. The tunable filter cartridge of claim 21, wherein the tunable, asymmetric, tubular fluoropolymer filter membrane is made of an alloy of two or more polytetrafluoroethylene resins.

23. The tunable filter cartridge of claim 22, wherein the tunable, asymmetric, tubular fluoropolymer filter membrane is made of an alloy of a first layer of a first polytetrafluoroethylene resin, a second layer of a second polytetrafluoroethylene resin and an intermediate layer disposed between the first and second layers of a mixture of the first and second polytetrafluoroethylene resins.

24. The tunable filter cartridge of claim 19 wherein the means for locking the first and second tubes includes a plurality of locknuts each disposed on one of the opposite ends of the gas compartment.

* * * * *